United States Patent
Harrington et al.

(10) Patent No.: US 9,993,076 B2
(45) Date of Patent: Jun. 12, 2018

(54) MOVABLE TABLE

(71) Applicant: Integrant LLC, North Royalton, OH (US)

(72) Inventors: Daniel P. Harrington, Gates Mills, OH (US); Gregory D. Clark, Aurora, OH (US); John Evan Spirk, Gates Mills, OH (US); Alex Lei Velet, Westlake, OH (US); David J. Boll, Avon, OH (US); Virginia Stewart, Cleveland Heights, OH (US); Nicholas Emile Stanca, Westlake, OH (US)

(73) Assignee: Integrant LLC, North Royalton, OH (US)

( * ) Notice: Subject to any disclaimer, the term of this patent is extended or adjusted under 35 U.S.C. 154(b) by 0 days. days.

(21) Appl. No.: 15/152,636

(22) Filed: May 12, 2016

(65) Prior Publication Data

US 2016/0331134 A1  Nov. 17, 2016

Related U.S. Application Data

(60) Provisional application No. 62/160,932, filed on May 13, 2015.

(51) Int. Cl.
*A47B 83/00* (2006.01)
*A47B 83/04* (2006.01)
(Continued)

(52) U.S. Cl.
CPC .......... *A47B 83/045* (2013.01); *A47B 23/043* (2013.01); *A47B 23/046* (2013.01);
(Continued)

(58) Field of Classification Search
CPC . A47B 23/046; A47B 9/20; A47B 2200/0023; A47B 9/10; A47B 61/06; A47B 2200/0027
(Continued)

(56) References Cited

U.S. PATENT DOCUMENTS 1,845,353 A * 2/1932 Snell ................... F25D 23/062
220/592.05
2,614,016 A * 10/1952 Regenhardt ............ A47B 87/02
206/509

(Continued)

FOREIGN PATENT DOCUMENTS

CA  2902822  *  9/2014
DE  2439633  *  3/1976

*Primary Examiner* — Janet Marie Wilkens
(74) *Attorney, Agent, or Firm* — Rankin, Hill & Clark LLP

(57) ABSTRACT

A movable table assembly includes a base, a vertical support, and a table. The base includes a longitudinal frame member and at least one wheel. The vertical support connects with the base at either a first mounting location adjacent a first end of the longitudinal frame member or a second mounting location adjacent a second, opposite, end of the longitudinal frame member. The table connects with the vertical support and is vertically offset from the base. The table extends away from the vertical support toward the second end of the longitudinal frame member when the vertical support is connected with the base at the first mounting location. The table extends away from the vertical support toward the first end of the longitudinal frame member when the vertical support is connected with the base at the second mounting location.

11 Claims, 14 Drawing Sheets

(51) Int. Cl.
*B60B 33/00* (2006.01)
*A47B 23/04* (2006.01)
*A47B 23/06* (2006.01)

(52) U.S. Cl.
CPC .............. *B60B 33/00* (2013.01); *A47B 23/06* (2013.01); *A47B 2023/047* (2013.01)

(58) Field of Classification Search
USPC ........ 108/25, 26, 147, 144.11, 50.01, 50.02; 280/47.35, 47.34, 79.11, 79.3; 312/107, 312/108, 111, 198, 401
See application file for complete search history.

(56) References Cited

U.S. PATENT DOCUMENTS

| | | | | |
|---|---|---|---|---|
| 2,646,329 | A * | 7/1953 | Wilhide | B25H 1/12 312/222 |
| 2,681,840 | A * | 6/1954 | Miller | A47B 23/04 108/49 |
| 3,065,334 | A * | 11/1962 | Hillenbrand | F21V 21/34 16/96 R |
| 3,084,985 | A * | 4/1963 | Bergman | A47B 87/02 312/111 |
| 3,341,270 | A * | 9/1967 | Sohl | A47B 57/18 312/108 |
| 3,450,296 | A * | 6/1969 | Schreyer | A47B 88/90 211/184 |
| 3,482,895 | A * | 12/1969 | Becklin | A47B 96/06 206/305 |
| 3,529,878 | A * | 9/1970 | Blowers | A47B 87/0292 312/107 |
| 3,936,109 | A * | 2/1976 | Richardson | A47B 19/08 108/150 |
| 3,974,898 | A * | 8/1976 | Tullis | A45C 7/0045 190/108 |
| 4,239,306 | A * | 12/1980 | Klaus | A47B 47/06 211/194 |
| 4,607,897 | A * | 8/1986 | Schwartz | F16M 11/42 248/188.7 |
| 4,719,068 | A * | 1/1988 | Hartman | A47B 13/02 264/263 |
| 5,038,434 | A | 8/1991 | Navarrette | |
| 5,551,105 | A | 9/1996 | Short | |
| 5,598,788 | A * | 2/1997 | Jonker | A47B 9/10 108/147 |
| 6,543,369 | B1 | 4/2003 | Swensson et al. | |
| 6,615,744 | B1 | 9/2003 | Eckstein et al. | |
| 6,732,858 | B1 * | 5/2004 | Chang Ou | A47B 87/0276 206/278 |
| 7,032,522 | B2 | 4/2006 | George et al. | |
| 7,201,251 | B1 * | 4/2007 | Baird | H04R 1/227 181/145 |
| 7,314,010 | B2 | 1/2008 | George et al. | |
| 7,540,243 | B2 | 6/2009 | George et al. | |
| 8,100,061 | B2 | 1/2012 | Hookway et al. | |
| 8,316,777 | B1 * | 11/2012 | Rosing | A47B 23/046 108/49 |
| 8,677,528 | B2 | 3/2014 | Hookway et al. | |
| 2004/0163574 | A1 | 8/2004 | Schoenbach et al. | |
| 2006/0076261 | A1 * | 4/2006 | Kurtenbach | A47B 87/0292 206/511 |
| 2007/0108203 | A1 * | 5/2007 | Vroon | B65D 19/18 220/1.5 |
| 2009/0101047 | A1 | 4/2009 | Mulaw et al. | |
| 2009/0184613 | A1 * | 7/2009 | Barina | G06F 1/181 312/334.23 |
| 2009/0212670 | A1 * | 8/2009 | Bustle | A47B 21/0314 312/209 |
| 2009/0266274 | A1 | 10/2009 | Berlin et al. | |
| 2010/0012165 | A1 * | 1/2010 | Bedard | A47J 37/0786 136/205 |
| 2010/0295430 | A1 * | 11/2010 | Cheng | B25H 3/028 312/249.11 |
| 2011/0175506 | A1 * | 7/2011 | Davis | A47B 23/046 312/287 |
| 2013/0307237 | A1 * | 11/2013 | Chen | A61G 12/001 280/35 |
| 2015/0257528 | A1 * | 9/2015 | Rosing | A47B 23/046 108/3 |

* cited by examiner

MOVABLE TABLE

BACKGROUND

Bedside or overbed tables are used adjacent beds in hospitals, long term care facilities, nursing homes and home bedrooms. These tables are used for the convenience of the caregiver and the patient or individual in the adjacent bed. Overbed tables, which can be considered a type of bedside table, have a tray table that is positionable over the bed.

Known bedside or overbed tables have certain drawbacks. Some known bedside tables can also be difficult to place adjacent certain beds. Known bedside and overbed tables are also limited to a left-hand or right-hand configuration making them only useful on one side of the bed, or very difficult to use if on the opposite side of the bed.

SUMMARY

In view of the foregoing, a movable table assembly that can be used as a bedside or overbed table is provided; however, the movable table assembly can be used in locations other than next to a bed and can be useful for other purposes. The movable table assembly is configurable in a left-hand or right-hand configuration. Such a movable table assembly includes a base, a vertical support, and a table. The base includes a longitudinal frame member and at least one wheel. The vertical support connects with the base at either a first mounting location adjacent a first end of the longitudinal frame member or a second mounting location adjacent a second, opposite, end of the longitudinal frame member. The table connects with the vertical support and is vertically offset from the base. The table extends away from the vertical support toward the second end of the longitudinal frame member when the vertical support is connected with the base at the first mounting location. The table extends away from the vertical support toward the first end of the longitudinal frame member when the vertical support is connected with the base at the second mounting location.

In another example, a movable table assembly includes a base, a vertical support, a table, a first cabinet, a second cabinet and a latch mechanism. The base includes at least one wheel. The vertical support connects with the base. The table connects with the vertical support and is vertically offset from the base. The first cabinet connects with the vertical support. The second cabinet connects with the first cabinet. The latch mechanism connects the first cabinet with the second cabinet so as to connect the second cabinet to the vertical support through the first cabinet.

DETAILED DESCRIPTION

Figure 1:
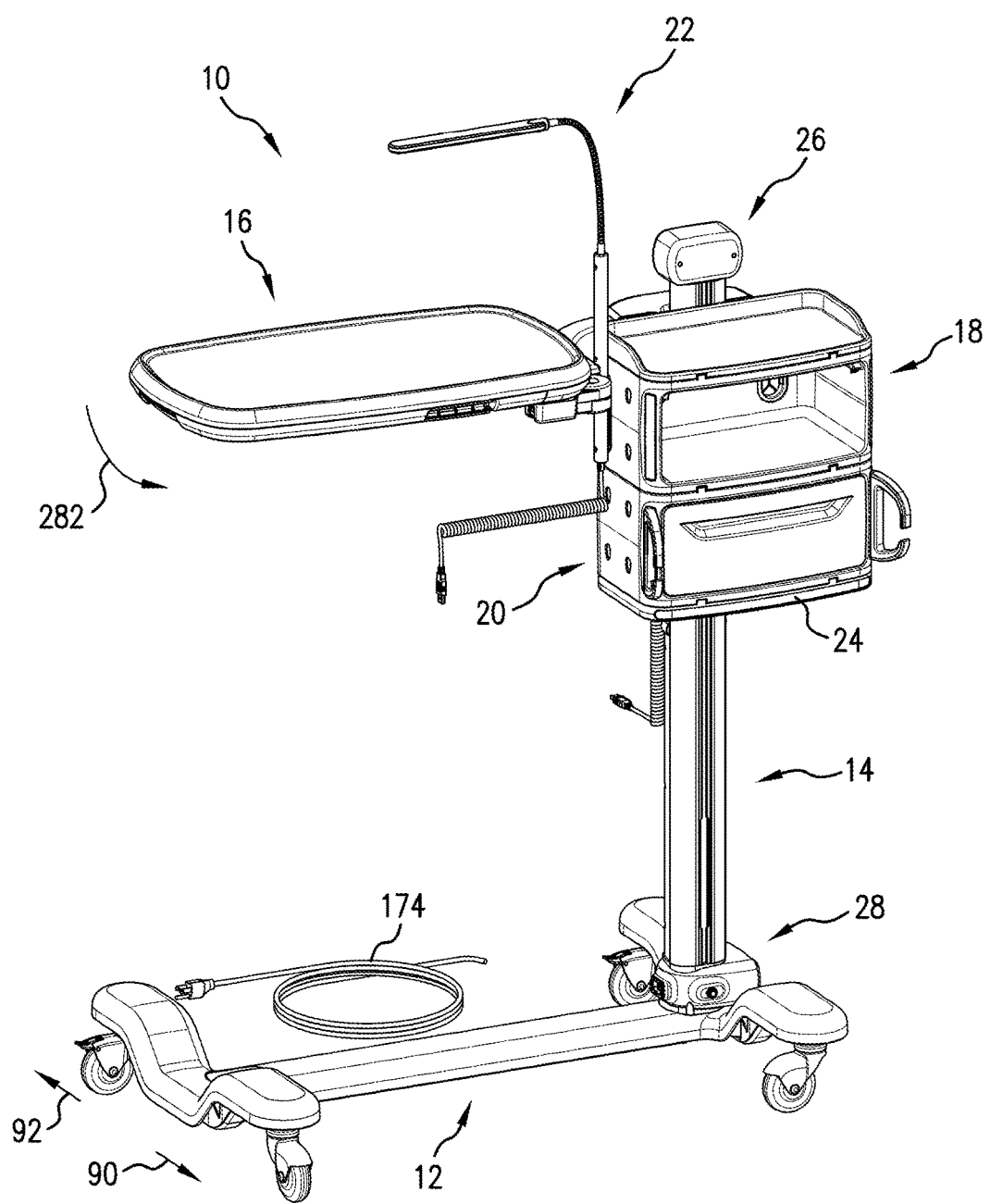
FIG. 1 is a perspective view of a movable table assembly in a right side configuration.
Figure 2:
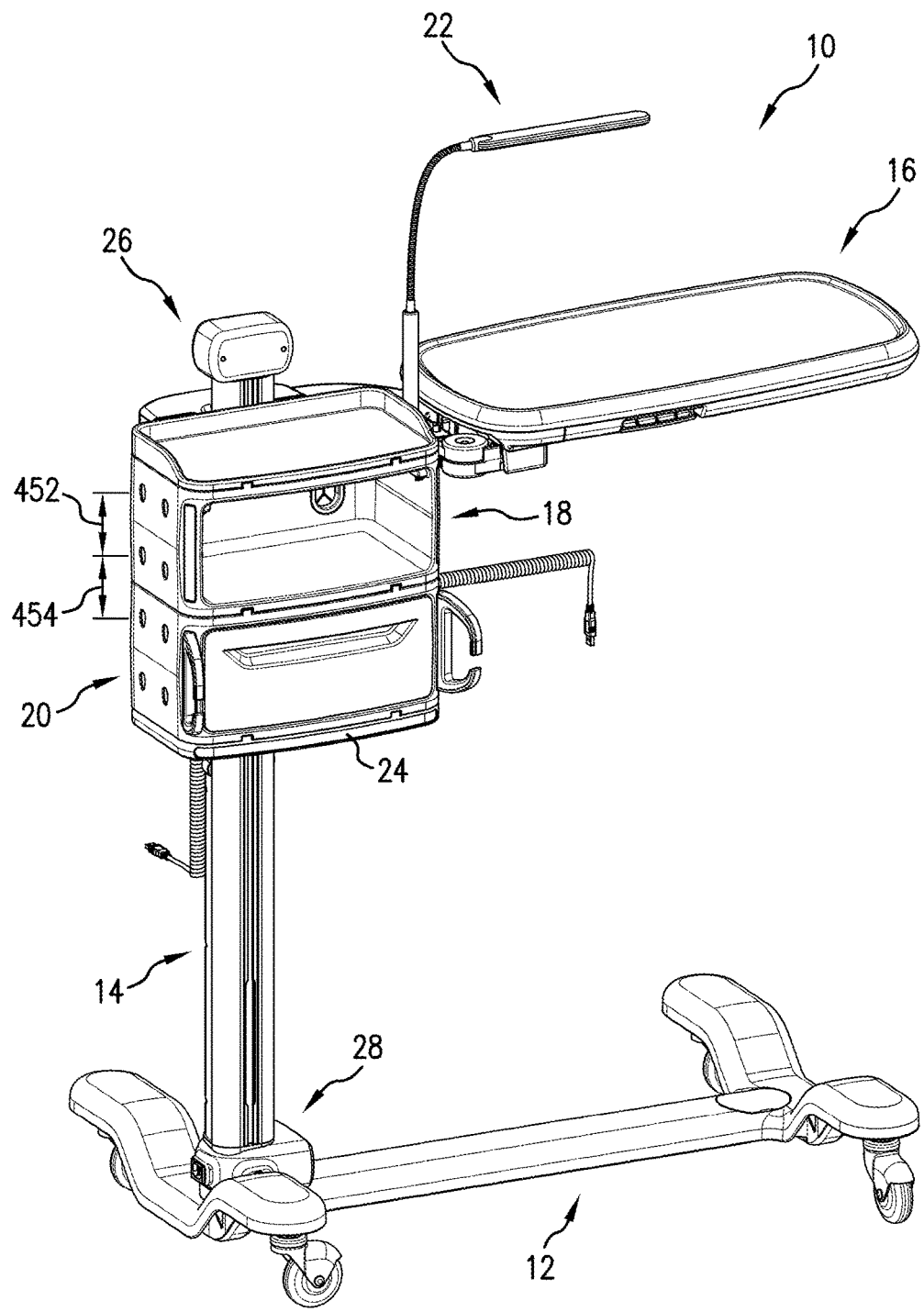
FIG. 2 is a perspective view of the movable table assembly of FIG. 1 in a left side configuration.

FIG. 1 depicts a movable table assembly 10 in a right side (also referred to as right-hand) configuration, and FIG. 2 depicts the movable table assembly 10 in a left side (or left-hand) configuration. The movable table assembly 10 is able to be easily assembled in either configuration by an end purchaser of the movable table assembly 10. Moreover, the movable table assembly 10 can be easily maneuvered and adjusted for the individual or patient's needs in either configuration. When in the right side configuration, the movable table assembly 10 is conducive for placement on the right side of a person's bed, and when in the left side configuration, the movable table assembly 10 is conducive for placement on the left side of a person's bed. In general, the movable table assembly 10 includes a base 12, a vertical support 14, a table 16, and a cabinet, which in the illustrated embodiment includes an upper cabinet 18 and a lower cabinet 20. The movable table assembly 10 can also include useful accessories, such as a task light 22, an ambient light fixture 24, and power distribution units such as an upper power distribution unit 26 and a lower power distribution unit 28.

Figure 3:
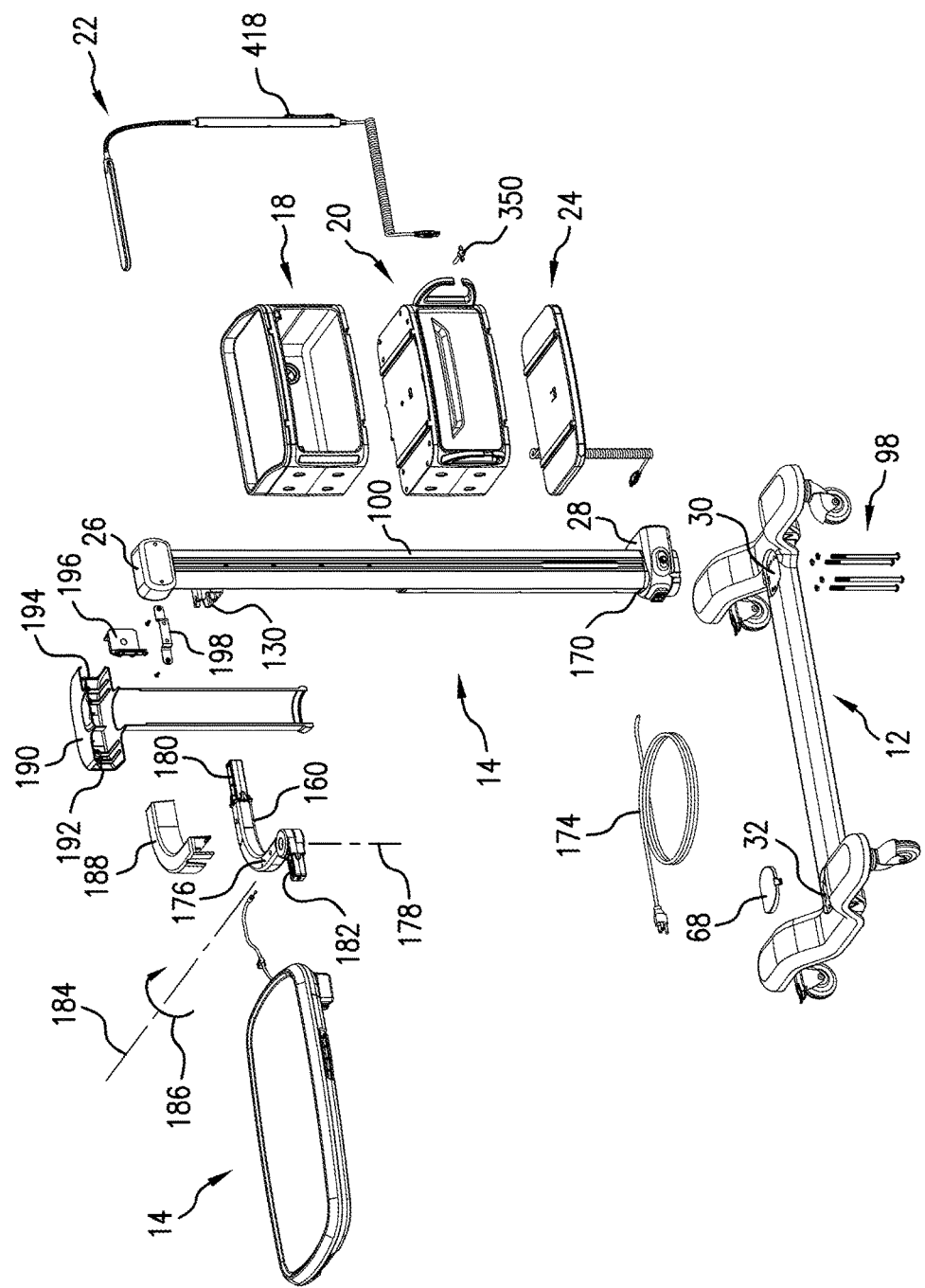
FIG. 3 is an exploded view of the movable table assembly shown in FIG.
Figure 4:
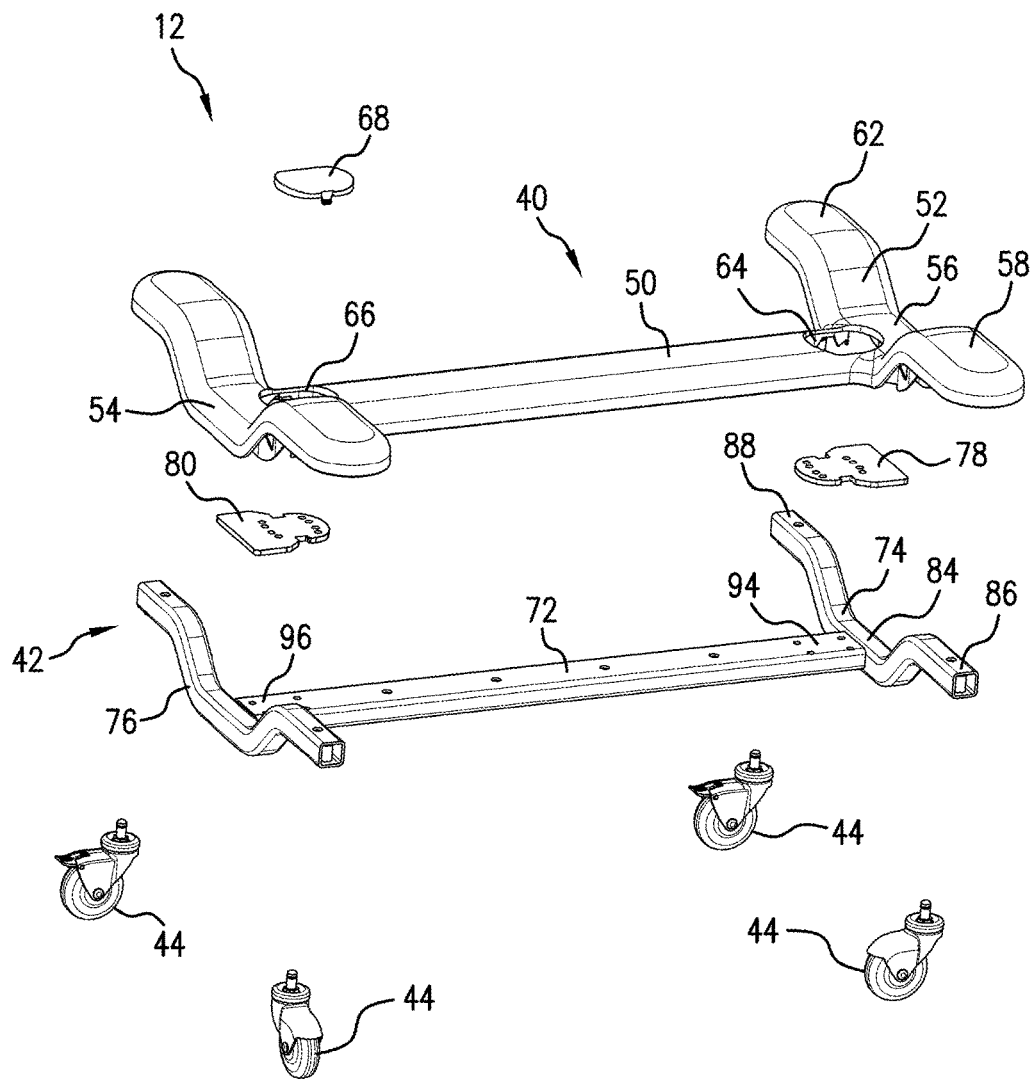
FIG. 4 is an exploded view of a base of the movable table assembly shown in FIG. 1.

With reference to FIG. 3, the vertical support 14 is connectable with the base 12 at either a first mounting location 30 (as shown in FIG. 1) or a second mounting location 32 (as shown in FIG. 2). FIG. 4 depicts an exploded view of the base 12. The base 12 includes a cover 40, a frame assembly 42, and a plurality of wheels 44. In the illustrated embodiment, the cover 40 is made from plastic and is a decorative piece that covers the frame assembly 42. In the illustrated embodiment, the frame assembly 42 is made from metal components; however, other rigid materials could be used. In the illustrated embodiment, the wheels 44 are four identical 360° vertically rotatable casters for improved maneuverability and stability.

In the illustrated embodiment, the cover 40 is an integrally formed single piece of plastic including an elongate longitudinal section 50 having a first transverse end section 52 at one end thereof and a second transverse end section 54 at an opposite end of the elongate longitudinal section 50. The first transverse end section 52 is identical to the second transverse end section 54. As such, only the first transverse end section 52 will be described with particularity. The first transverse end section 52 includes a relatively lower mid section 56 that transitions to a first (forward) raised outer section 58 on one side of the longitudinal section 50 and a second (rear) raised outer section 62 on an opposite side of the longitudinal section 50. The lower mid section 56 of the first transverse end section 52 is at the same elevation as the longitudinal section 50. One wheel 44 is positioned beneath each raised outer section 58, 62. With the lower mid section 56 and the longitudinal section 50 being positioned beneath the raised outer sections 58, 62, the center of gravity for the movable table assembly 10 is lowered, which provides stability for the movable table assembly 10. The cover 40 further includes vertical support mounting openings 64, 66.

The first vertical support mounting opening 64 is provided through the longitudinal section 50 adjacent the first transverse end section 52. The second vertical support mounting opening 66 is provided through the longitudinal section 50 adjacent the second transverse end section 54. A cap 68 selectively connects with the cover 40 to cover either the first vertical support mounting opening 64 or the second vertical support mounting opening 66 depending on the configuration of the movable table assembly 10 (see FIGS. 1 and 2).

The frame assembly 42 includes a longitudinal frame member 72, a first transverse frame member 74 and a second transverse frame member 76. The frame assembly 42 also includes a first connector plate 78 and a second connector plate 80, both which can facilitate connection of the vertical support 14 with the frame assembly 42. The longitudinal frame member 72 can be a hollow metal rod and is covered by the longitudinal section 50 of the cover 40. The first transverse frame member 74 can also be a hollow metal rod that is bent to follow the contour of the first transverse end section 52 of the cover 40. Similarly, the second transverse frame member 76 can also be a hollow metal rod that is bent in a similar manner to the second transverse end section 54 of the cover 40. The first transverse frame member 74 is identical in configuration to the second transverse frame member 76. As such, the first transverse frame member 74 will be described with particularity. The first transverse frame member 74 includes a lower central section 84, a first (forward) elevated outer section 86, and a second (rear) elevated outer section 88. The lower central section 84 is in vertical alignment with the longitudinal frame member 72. Each elevated outer section 86, 88 is elevated with respect to the lower central section 84 and the longitudinal frame member 72. Each transverse member 74, 76 extends from the longitudinal frame member 72 a greater distance in a forward direction (arrow 90 in FIGS. 1 and 2) as compared to a rearward direction (arrow 92 in FIGS. 1 and 2). One of the wheels 44 connects with the first transverse frame member 74 at the first elevated outer section 86 and another wheel 44 connects with the first transverse frame member 74 at the second elevated outer section 88. When the base 12 is assembled, the first connector plate 78 is aligned with and disposed beneath the first vertical support mounting opening 64 and the second connector plate 80 is aligned with and disposed beneath the second vertical support mounting opening 66. The base 12 can be assembled using fasteners or other conventional fastening methods such as welding and the like.

With reference back to FIGS. 1 and 2, the vertical support 14 connects with the base 12 and extends upwardly therefrom. As mentioned above, the vertical support 14 connects with the base 12 at either the first mounting location 30 (see FIG. 3) adjacent a first end 94 of the longitudinal frame member 72 or the second mounting location 32 (see FIG. 3) adjacent a second, opposite, end 96 of the longitudinal frame member 72. As seen in FIG. 3, in the illustrated embodiment a plurality of fasteners 98 are provided to connect the vertical support 14 with the base 12. The fasteners 98 extend through fastener openings in either the first connector plate 78 or the second connector plate 80 and into the vertical support 14. The vertical support 14 could connect with the base 12 in other conventional manners. Depending on the configuration of the movable table assembly 10, the cap 68 is provided to cover the vertical support mounting opening 64, 66 that is not covered by the vertical support 14.

Figure 5:
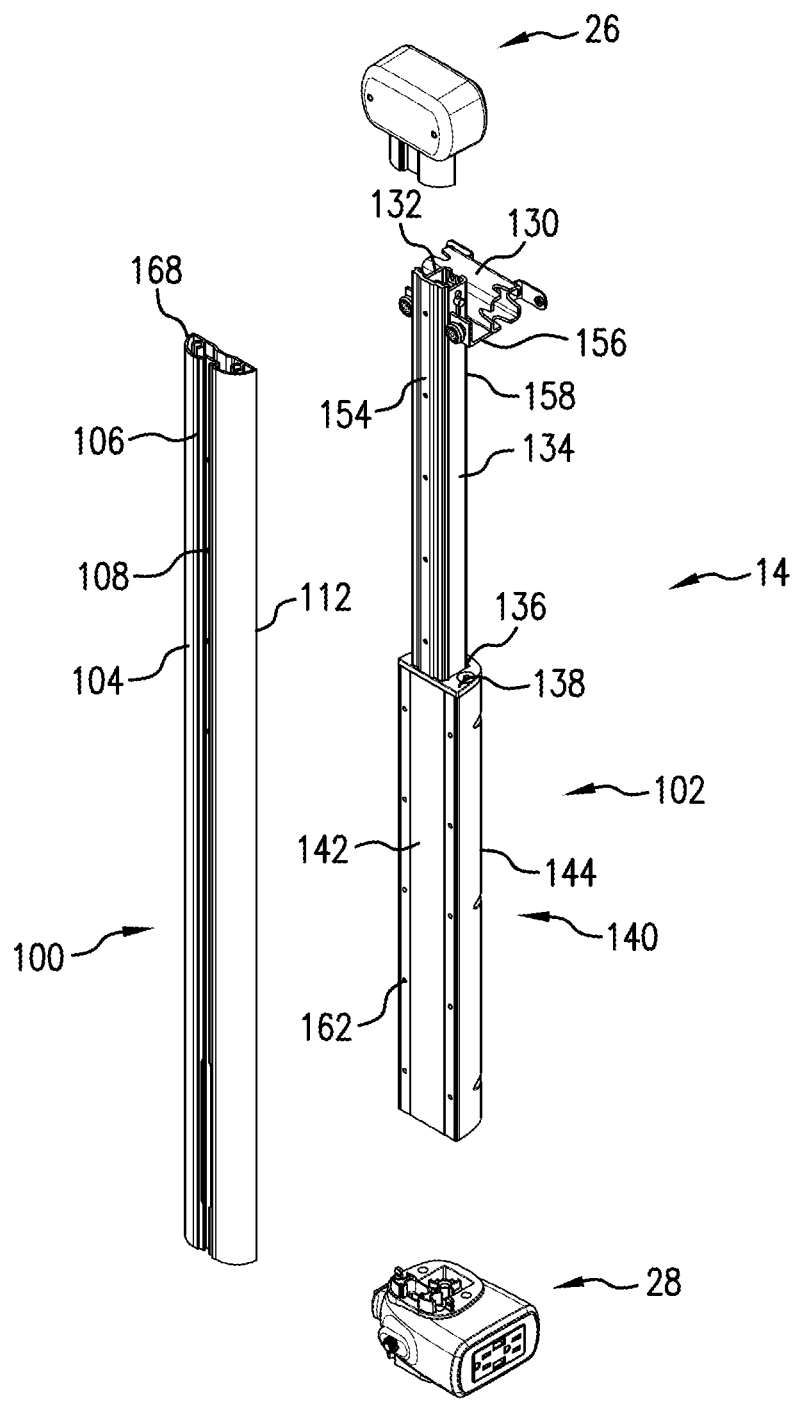
FIGS. 5 and 6 are exploded views of a vertical support of the movable table assembly shown in FIG. 1.

With reference to FIG. 5, the vertical support 14 includes a forward (first) column 100 and a rear (second) column 102.

The forward column 100 connects with the rear column 102 to make up the vertical support 14. The forward column 100 includes a forward face 104, which is curved in the illustrated embodiment. The forward column 100 includes a track 106, which is T-shaped in plan view, extending along the vertical length of the forward column 100. A plurality of forward openings 108 extend through the forward face 104 and are positioned within the track 106. The forward openings 108 are provided for attaching the upper cabinet 18 to the vertical support 14 in a manner that will be described in more detail below. With respect to FIG. 6, the forward column 100 further includes a rear face 112 opposite the forward face 104. The rear face 112 is generally planar although it includes a rear longitudinal recess 114 extending along the vertical length of the forward column 100. A plurality of rear upper larger central openings 116 are provided through the rear face 112 and are aligned with respective forward openings 108 for attaching the upper cabinet 18 (FIG. 1) to the vertical support 14. A plurality of rear upper smaller central openings 118 are provided in the rear longitudinal recess 114 through the rear face 112 to facilitate connecting the forward column 100 with the rear column 102. The forward column 100 further includes a plurality of rear lower openings 120 disposed outside and on opposite sides of the rear longitudinal recess 114. These rear lower openings 120 receive fasteners for attaching the forward column 100 with the rear column 102; however, other conventional methods of attaching the forward column with the rear column can be used.

The rear column 102 in the illustrated embodiment is an assembly including an arm support 130 that connects with an upper section 132 of a vertical support bar 134. The vertical support bar 134 extends through an upper opening 136 provided in a cap 138 on a cylinder housing 140, which includes a forward face 142 and a rear face 144. The vertical support bar 134 is movable with respect to the cylinder housing 140 so as to be received in the cylinder housing 140 when moved in a downward vertical direction. The rear column 102 further includes a rod 146 (see FIG. 14) that is disposed inside the vertical support bar 134. The rod 146 connects with the arm support 130 near the upper section 132 of the vertical support bar 134. A valve release mechanism 148 is also provided at the upper end of the rod 146. The rod 146 extends outwardly from a shock cylinder 152 having a portion of the rod 146 disposed therein. Activation of the valve release mechanism 148 opens a valve which releases gas from the shock cylinder 152 to allow for vertical adjustment of the rod 146, and thus the vertical support bar 134, with respect to the shock cylinder 152. The rear column 102 also includes an elongate track 154 extending upwardly from the cap 138 on the cylinder housing 140. Rollers 156 connect with the arm support 130 and ride along outer edges 158 of the elongate track 154 as the vertical support bar 134 and the arm support 130 move with respect to the cylinder housing 140.

With reference to FIG. 3, an arm 160 connects the table 16 with the vertical support 14 through the arm support 130 (see FIGS. 4 and 5). Vertical adjustment of the table 16 with respect to the base 12 is provided by way of the shock cylinder 152 and the rod 146 in a manner that will be described in more detail below. With reference back to FIG. 5, the forward face 142 of the cylinder housing 140 is generally planar to match the rear face 112 of the forward column 100. Fastener openings 162 extend through the forward face 142 and align with the rear lower openings 120 (FIG. 6) on the rear face 112 of the forward column 100 to connect the forward column 100 with the rear column 102.

Figure 6:
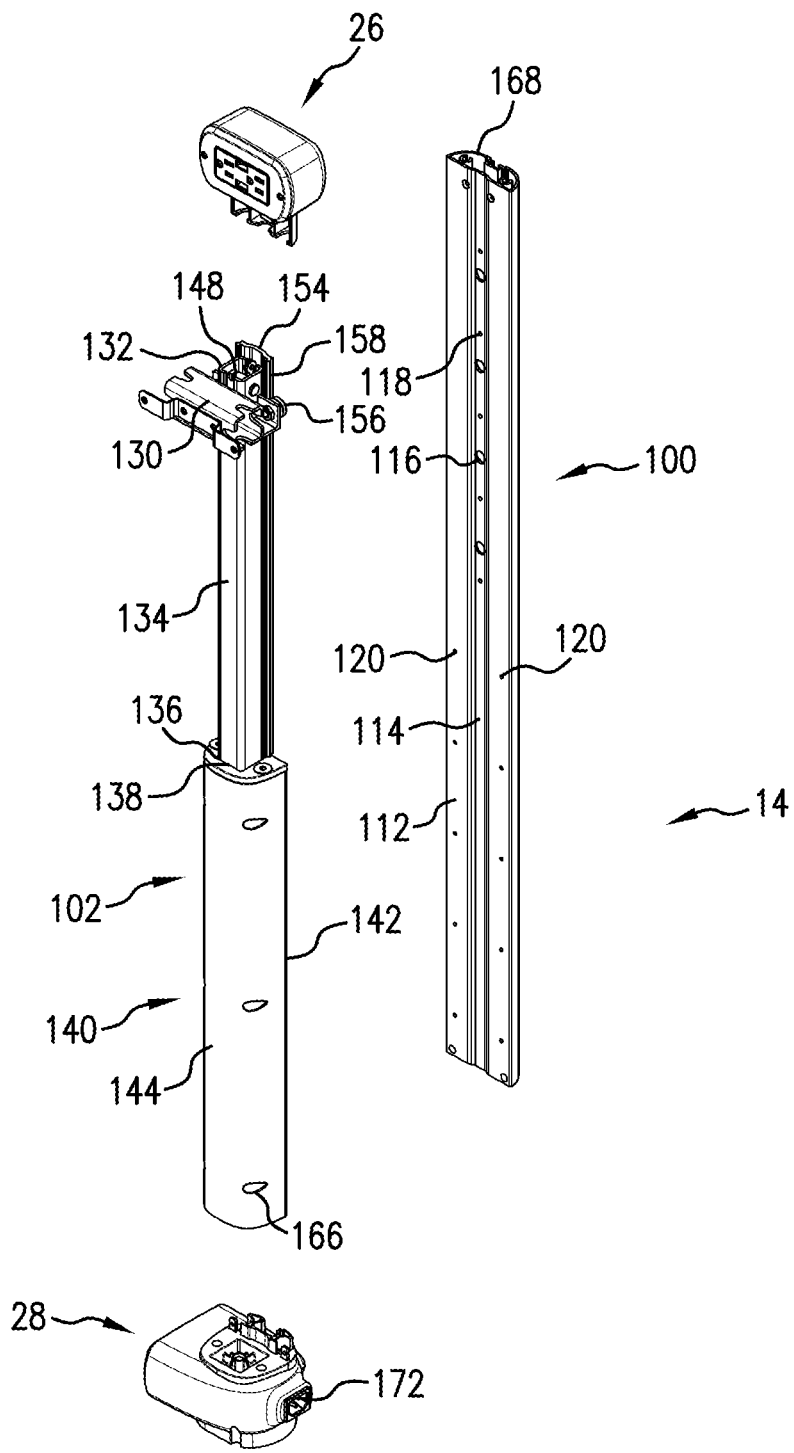

With reference to FIG. 6, the rear face 144 of the cylinder housing 140 is curved and includes a plurality of openings 166 that align with the openings 162 to receive the fasteners to connect the forward column 100 with the rear column 102.

The upper power distribution unit 26 attaches to an upper end 168 of the forward column 100. The illustrated upper power distribution unit 26 is provided with conventional electrical outlets and USB ports. The lower power distribution unit 28 attaches at a lower end 170 (when assembled, see FIG. 3) of both the forward column 100 and a rear column 102. The lower power distribution unit also includes conventional electrical outlets and USB ports. With reference to FIG. 6, the lower power distribution unit 28 also includes an adaptor input 172 for receiving a power cord adaptor (not shown) on a standard power cord 174. The upper power distribution unit 26 is electrically connected with the lower power distribution unit 28 via electrical lines (not shown). Power can be provided to the power distribution units 26, 28 by way of the power cord 174 being plugged into a standard wall outlet. The power cord 174 can be disconnected from the lower power distribution unit 28 by removing the power cord adaptor (not shown) from the adaptor input 172 to facilitate moving the movable table assembly 10.

With reference back to FIG. 3, the arm 160 connects the table 16 with the vertical support 14. The arm 160 includes a hub 176, which defines a rotational axis 178, which is vertical in the orientation shown in FIG. 3. The arm is generally L-shaped or J-shaped in plan view. A first end section 180 of the arm 160 is received in the arm support 130, and a second end section 182 of the arm 160 attaches with the table 16 in a manner described in more detail below. The second end section 182 of the arm 160 extends from the hub 176. The table 16 can rotate with respect to the vertical support 14 around the vertical axis 178 defined by the hub 176. FIG. 3 depicts the movable table assembly 10 in the right side configuration, which is also shown in FIG. 1. No matter the orientation (left-hand or right-hand) of the movable table assembly 10, the table 16 is configured to rotate forward, i.e. toward a person in bed, in the direction generally shown by arrow 90 in FIG. 1 from the location shown in FIGS. 1 and 2. In the illustrated embodiment, the table 16 does not rotate about the vertical axis 178 rearward (generally in the direction of arrow 92) beyond the location of the table 16 shown in FIGS. 1 and 2. As such, for stability each transverse member 74, 76 extends from the longitudinal frame member 72 a greater distance in a forward direction (arrow 90 in FIGS. 1 and 2) as compared to a rearward direction (arrow 92 in FIGS. 1 and 2).

The arm support 130 is hollow throughout so that the arm 160 can connect with the arm support by being received in either side, i.e., the arm 160 can connect with the arm support 130 to extend from a left side of the vertical support 14, as shown in FIG. 1, or the arm 160 can connect with the arm support 130 to extend from a right side of the vertical support 14 as shown in FIG. 2. To provide a left side configuration, which is shown in FIG. 2, the first end section 180 is received on an opposite side of the arm support 130 than that shown in FIG. 3 and is turned over or rotated about a horizontal axis 184 in the direction of arrow 186. The vertical support 14 would connect at an opposite side of the base 12 as that shown in FIG. 3, and the cap 68 would cover the opposite vertical support mounting opening, i.e., the vertical support mounting opening that would be covered by the vertical support 14 as shown in FIG. 3.

An arm cover 188 similar in configuration to the arm 160 covers the arm to provide an aesthetic cover. A vertical support cover 190 connects with the forward column 100 to cover the vertical support bar 134. When the vertical support cover 190 is connected with the forward column 100, a first opening 192 and a second opening 194 on an opposite side of the first opening are provided. When the movable table assembly 110 is configured in the right side configuration (FIG. 1) the arm 160 extends through the first opening 192. When the movable table assembly 10 is in the left side configuration (FIG. 2) the arm 160 is received through the second opening 194. A cover cap 196 connects with the vertical support cover 190 to cover either the first opening 192 or the second opening 194, whichever opening does not receive the arm 160. A mounting bracket 198 is also provided for attaching the vertical support cover 190 with the forward column 100.

Figure 7:
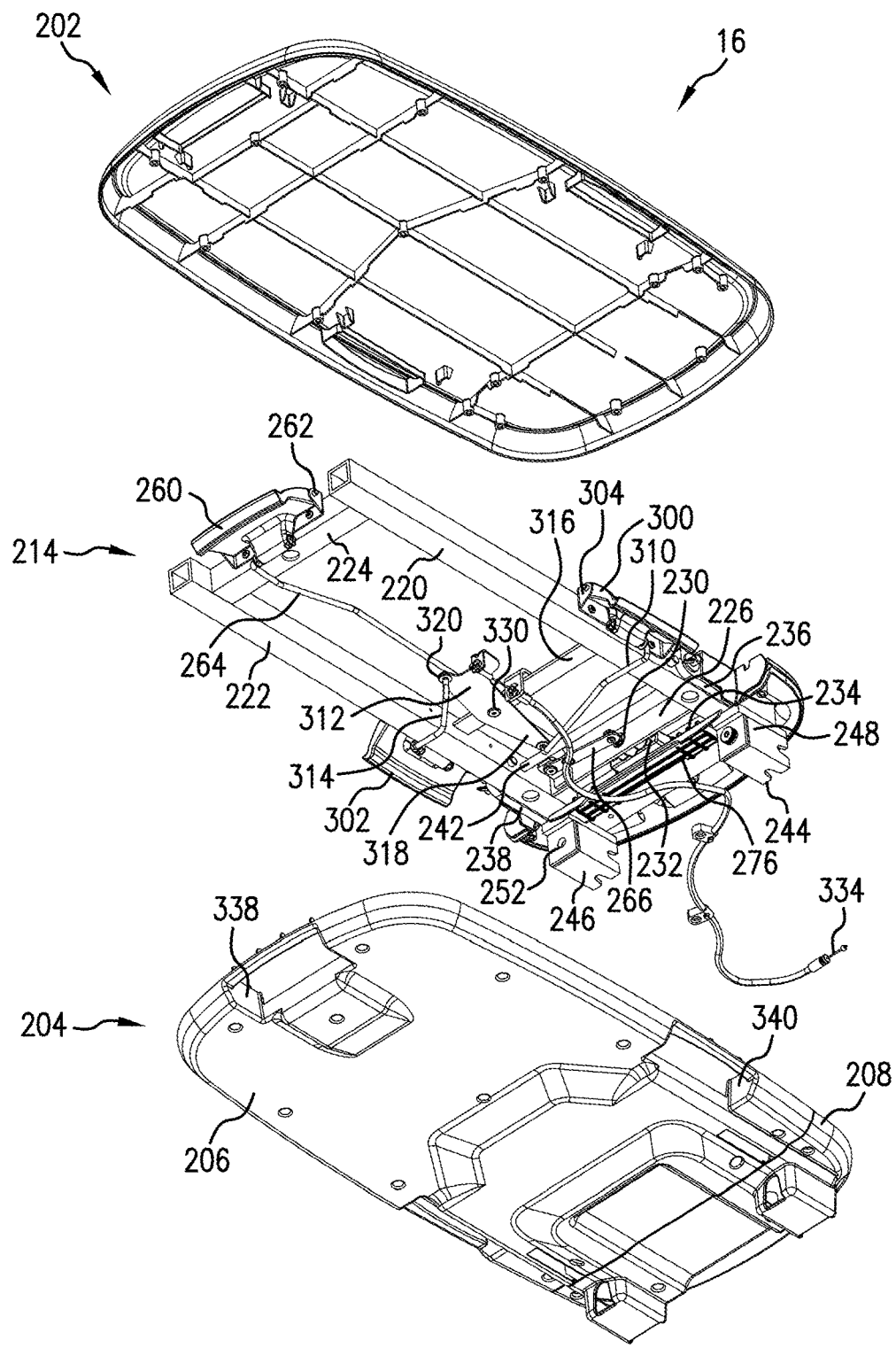
FIGS. 7 and 8 are exploded views of a table for the movable table assembly depicted in FIG. 1.
Figure 8:
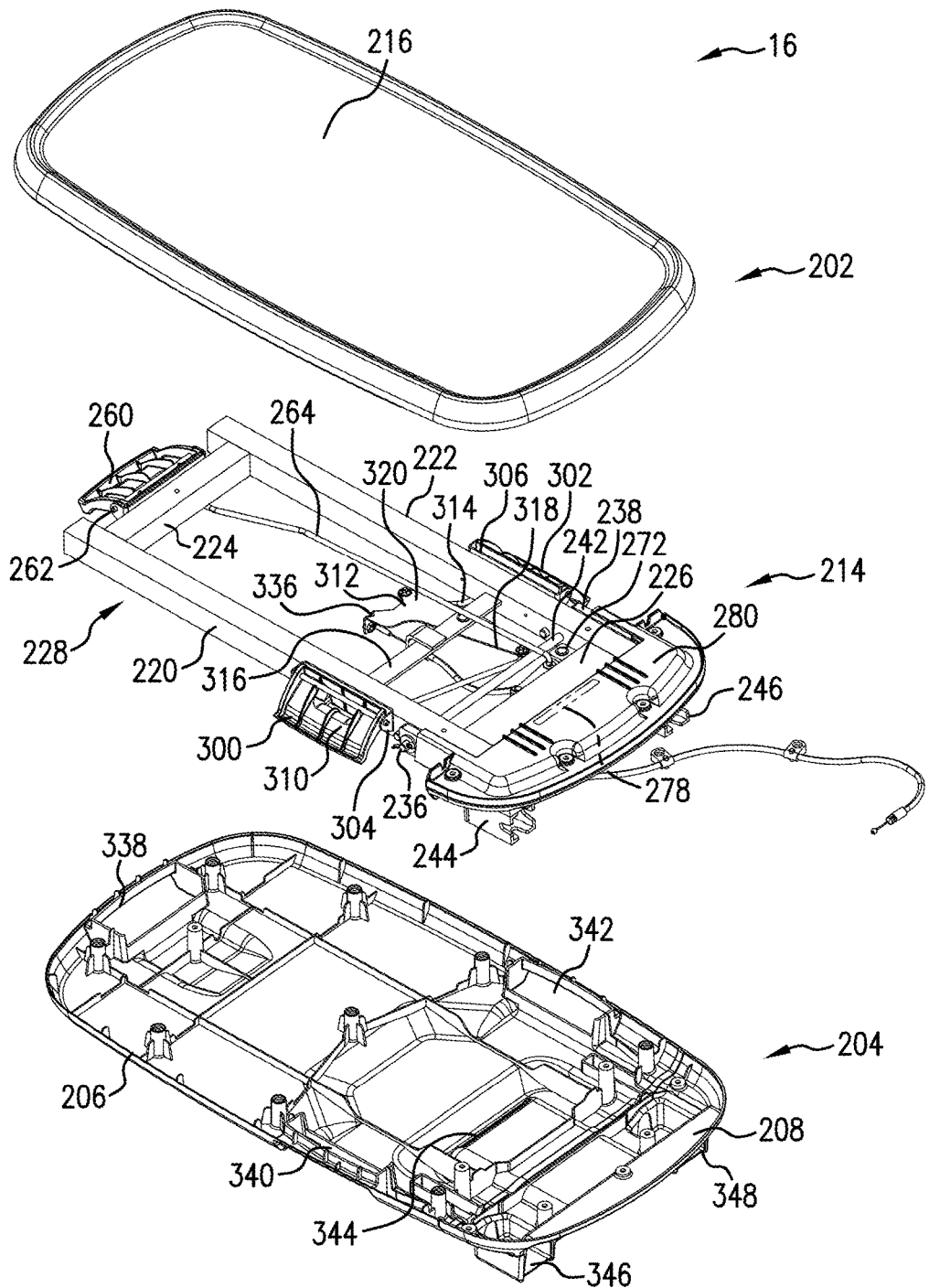

With reference to FIG. 7, the table 16 includes an upper section 202, a lower section 204, which includes a pivoting section 206 and a relatively stationary (non-pivoting) section 208, and a frame 214. The upper section 202, which in the illustrated embodiment is made from plastic, connects with the lower section 204, which in the illustrated embodiment is also made from plastic, to house the frame 214. With reference to FIG. 8, the upper section 202 provides a support surface 216 upon which items can be supported by the table 16. The upper section 202 connects with the lower section 204 using fasteners, which are not shown. Other manners of attaching the upper section 202 with the lower section 204 could be utilized.

The frame 214 includes a first rail 220 and a second rail 222 that is spaced from and identical in configuration to the first rail. A distal cross member 224 interconnects the first rail 220 with the second rail 222. A proximal cross member 226 also interconnects the first rail 220 and the second rail 222. The first rail 220, the second rail 222, the distal cross member 224 and the proximal cross member 226 connect together to provide a pivoting frame section 228. The proximal cross member 226 is generally upside down U-shaped in a cross section taken normal to its longest dimension of the proximal cross member. The proximal cross member 226 includes a distal central opening 230 and a larger proximal central opening 232.

The frame 214 further includes a hinge cross member 234 arranged parallel to the distal cross member 224 and the proximal cross member 226. A first hinge bracket 236 is provided at a first end of the hinge cross member 234, and a second hinge bracket 238 is provided at a second end of the hinge cross member 234. An axle 242 pivotally attaches the pivoting frame section 228 with the hinge brackets 236 and 238. The pivoting frame section 228 pivots with respect to the hinge cross member 234 about an axis defined by the axle 242.

The frame 214 further includes a first arm mount 244 connected with the first end of the hinge cross member 234 at a first end thereof and a second arm mount 246 connected with the second end of the hinge cross member 234 at the second end thereof. With reference back to FIG. 3, the second end section 182 of the arm 160 is received in either the first arm mount 244 or the second arm mount 246 depending on the configuration of the movable table assembly 10. When the movable table assembly 10 is in the right side configuration (FIG. 1) the first end section 180 of the arm 160 is received in the first arm mount 244. When the movable table assembly 10 is in the left side configuration (FIG. 2) the first end section 180 of the arm 160 is received in the second arm mount 246. The arm mounts 244 and 246 are hollow and include fastener openings 248, 252 to allow for attachment of the arm 160 with the respective arm mount 244 or 246.

The table 16 also includes a table pivot mechanism that allows for the table to selectively pivot with respect to the vertical support 14 about the axis defined by the axle 242. The table pivot mechanism includes a table pivot handle 260 pivotally attached to a bracket 262 fixed to the distal cross member 224. A release rod 264 connects the table pivot handle 260 with an actuator 266. The actuator 266 pivotally attaches to a bracket 268 fixed to either the first rail 220 or the proximal cross member 226 through a pin 272. The actuator 266 is pivotable about a vertical axis defined by the pin 272 with respect to the proximal cross member 226. The actuator 266 is connected with a latch (not visible) that extends through the distal central opening 230 and into a latch housing 276. The latch (not visible) further selectively extends through the proximal central opening 232 in the proximal cross member 226 to selectively engage a latch plate 278 (shown in phantom in FIG. 8) provided on the hinge cross member 234 under a cover 280, which can be plastic and connects with the stationary section 208 of the lower section 204. The latch plate 278 includes an opening (not visible) that selectively receives the latch to allow the table 16 to maintain the horizontal position shown in FIGS. 1 and 2. To pivot the table 16 toward the vertical support 14 in the direction of arrow 282 (FIG. 1), an operator lifts a distal end of the table pivot handle 260 pulling the release rod 264 away from the vertical support 14. The actuator 266 pivots about the vertical axis defined by the pin 272, which moves the latch out of engagement with the latch plate 278, which allows for the pivoting frame section 228 along with the upper section 202 and the pivoting section 206 of the lower section 204 to move as a unit and pivot about a horizontal axis defined by the axle 242.

The table 16 also includes a height adjustment mechanism. The height adjustment mechanism includes a first height adjustment handle 300 positioned on one side of the table 16 and a second height adjustment handle 302 positioned on an opposite side of the table 16. At least two handles 300, 302 are provided so that at least one of the handles is positioned near an occupant of the bed adjacent the movable table assembly 10 no matter the orientation of the movable table assembly 10. In other words, if the movable table assembly 10 is in the right side configuration shown in FIG. 1, the first height adjustment handle 300 is positioned nearer to the occupant of the bed, and if the movable table is in the configuration shown in FIG. 2, the second height adjustment handle 302 is positioned nearer to the occupant of the bed.

The first height adjustment handle 300 pivotally connects with a first bracket 304 fixed to the first rail 220. Similarly, the second height adjustment handle 302 pivotally connects with a second bracket 306 fixed to the second rail 222. A first rod 310 connects the first height adjustment handle 300 with a pulley 312. A second rod 314 connects the second height adjustment handle 302 with the pulley 312. The pulley 312 pivotally connects with a strap 316 spanning the first rail 220 and the second rail 222. The first rod 310 connects with a first ear 318 of the pulley 312 on one side of the strap 316 and the second rod 314 connects with a second ear 320 on a second side of the strap 316. The pulley 312 connects with the strap 316 through a pin 330 so that the pulley is rotatable about a vertical axis (per the orientation shown in FIG. 7) defined by the pin 330. A spring or springs can connect with the pulley or the handles 300, 302 to bias the pulley 312 or the handles 300, 302 to a first operating position, such as that shown in FIGS. 7 and 8.

An operator pulls up on a distal end of either the first height adjustment handle 300 or the second height adjustment handle 302, which results in the pulley 312 rotating about the vertical axis against the biasing force of the spring or springs (if present). A cable 334 attaches to a third ear 336 of the pulley 312. Rotation of the pulley 312 about the vertical axis results in the cable 334 being pulled. The cable 334 is covered. The cable 334 connects with the valve release mechanism 148 (see FIG. 5) to open the connected valve and allow gas to escape from the shock cylinder 152. While gas escapes from the cylinder, the height of the table 16 can be adjusted with respect to the base 12. The shock cylinder 152 and the valve release mechanism 148 can be configured to allow raising of the table 16 without movement of the handles 300, 302 from the first operating position (shown in FIGS. 7 and 8), but to inhibit or preclude lowering of the table 16 unless the handles 300, 302 have been rotated from the first operating position.

The lower section 204 of the table 16 includes a pivot handle opening 338 through the pivoting section 206 through which the table pivot handle 260 is accessible. The lower section 204 also includes a first height adjustment handle opening 340 through the pivoting section 206 through which the first height adjustment handle 300 is accessible. On an opposite side of the lower section 204, a second height adjustment handle opening 342 is provided through the pivoting section 206 through which the second height adjustment handle 302 is accessible. The lower section 204 also includes a cable opening 344 through the pivoting section 206, and the cable 334 extends through the cable opening 344. The lower section 204 also includes a first arm mount opening 346 and a second arm mount opening 348 in the stationary section 208. The arm mount openings 346 and 348 are shaped in a way to allow the table to pivot with the arm 160 received in either arm mount 244 or 246.

Figure 9:
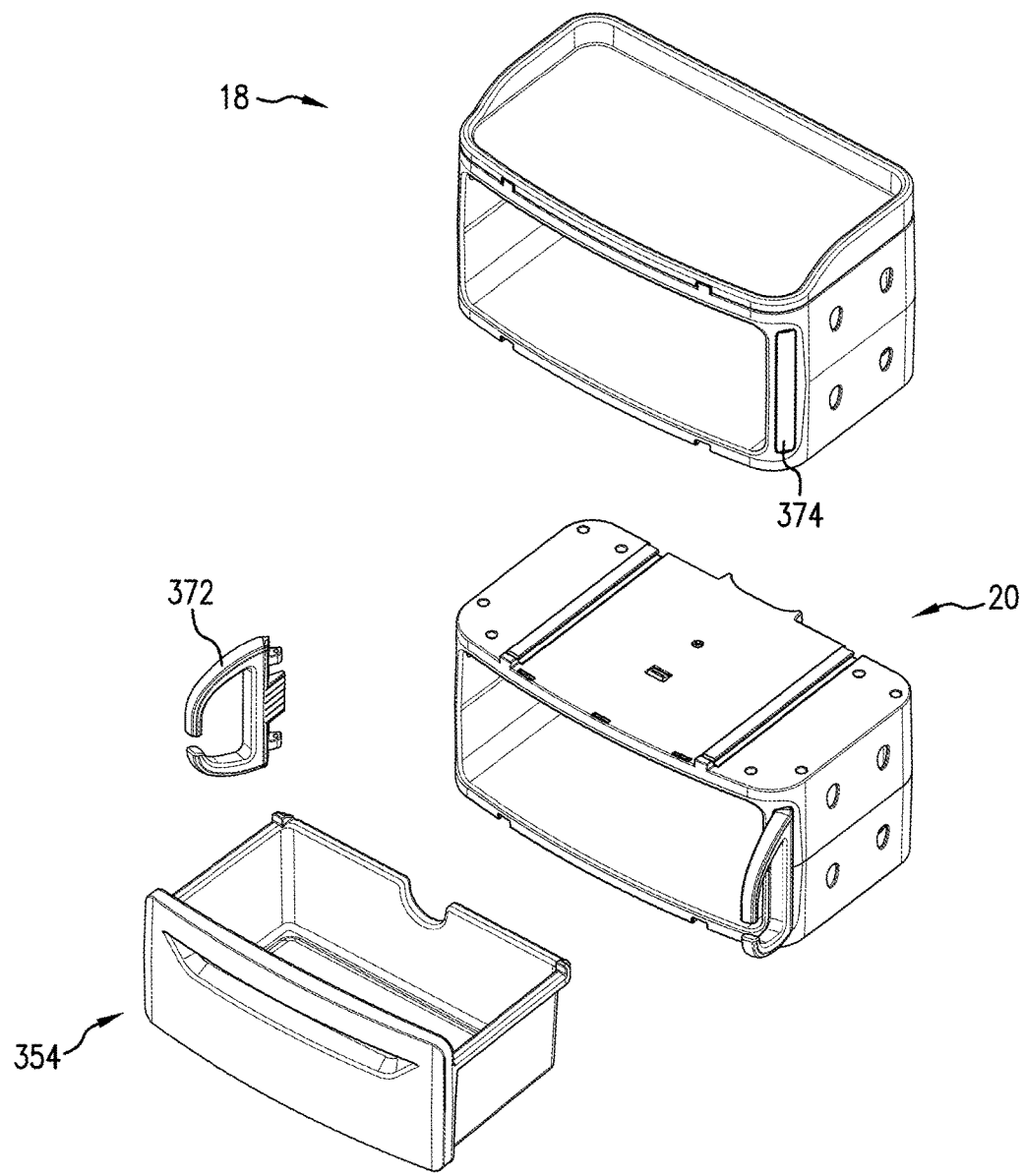
FIG. 9 is a perspective view of an upper cabinet and a lower cabinet, with a drawer removed, for the movable table assembly depicted in FIG. 1.

FIG. 9 depicts the upper cabinet 18 and the lower cabinet 20 for the movable table assembly 10 depicted in FIGS. 1 and 2. The movable table assembly 10 is configured such that the upper cabinet 18 connects with the vertical support 14, and the lower cabinet 20 connects with the vertical support 14 through its connection with the upper cabinet 18. In other words, the lower cabinet 20 is not directly connected with the vertical support 14; instead, only the upper cabinet 18 is directly connected with the vertical support 14 through the use of a fastener 350 (FIG. 3). The upper cabinet 18 and the lower cabinet 20 are made from similar components, which will be described in more detail below, allowing for fewer molds required to manufacture the cabinets 18, 20.

Figure 10:
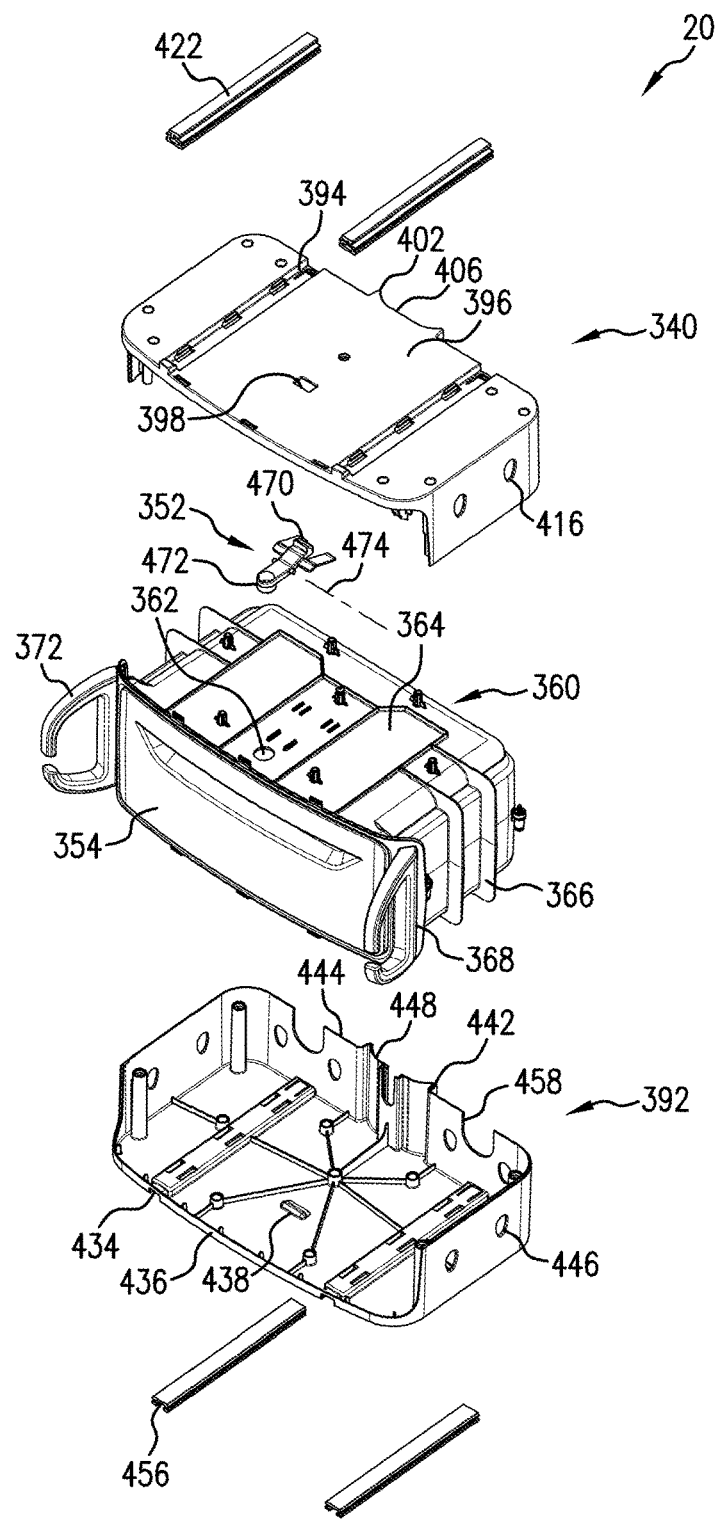
FIGS. 10 and 11 are exploded views of the lower cabinet shown in FIG. 9.

FIG. 10 depicts an exploded view of the lower cabinet 20. The upper cabinet 18, shown with handles 372 that could also connect to the upper cabinet 18 if desired, is of the same construction, with the exception that the upper cabinet 18 would not include a latch 352. Accordingly, the construction of the lower cabinet 20 will be discussed in detail with the understanding that the upper cabinet 18 would have the same construction.

Figure 11:
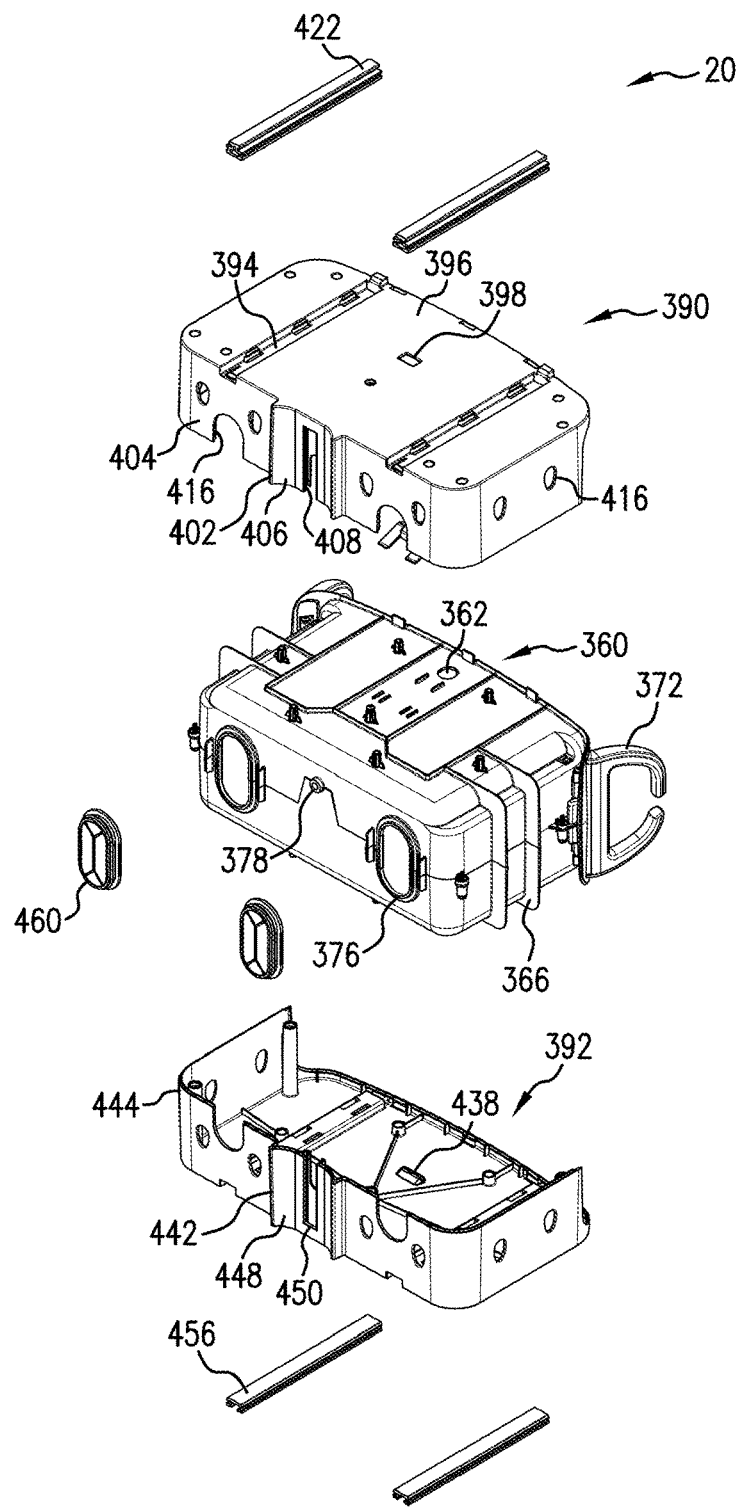

In the illustrated embodiment, the lower cabinet 20 receives a drawer 354. The drawer 354 can also be received in the upper cabinet 18. The lower cabinet 20 includes an inner housing 360 that is open at the front and provides a smooth interior surface for the lower cabinet 20. The inner housing 360 includes a latch actuator opening 362 provided through a top wall 364 of the inner housing. The inner housing 360 also includes fin-shaped standoffs 366 on opposite sides of the inner housing 360. The inner housing 360 also includes mounting locations 368. The mounting locations 368 are configured to provide for attachment of either the handles 372 or cover plates 374 (see FIG. 9). With reference to FIG. 11, the inner housing 360 further includes elliptical shaped openings 376, which are provided to allow for the passage of power cords through the lower cabinet 20. The inner housing 360 further includes a fastener opening 378. The larger elliptical openings 376 and the fastener opening 378 are both provided through a rear wall 382 of the inner housing 360. The fastener opening 378 is centrally located with respect to the sides of the inner housing 360. As discussed above, in the illustrated embodiment only the upper cabinet 18 is attached directly to the vertical support. However, since the inner housing 360 for the lower cabinet 20 is identical to the inner housing for the upper cabinet 18, the fastener opening 378 is provided. With reference back to FIG. 3, to attach the upper cabinet 18 to the vertical support 14, the fastener 350 is inserted through the fastener opening 378 and into the forward openings 108 on the forward column 100.

The cabinets 18, 20 are a double-wall construction. As such, the cabinets include an outer housing, which in the illustrated embodiment include an upper outer housing 390 and a lower outer housing 392. The upper outer housing 390 connects with the lower outer housing 392 to encase the inner housing 360.

Figure 12:
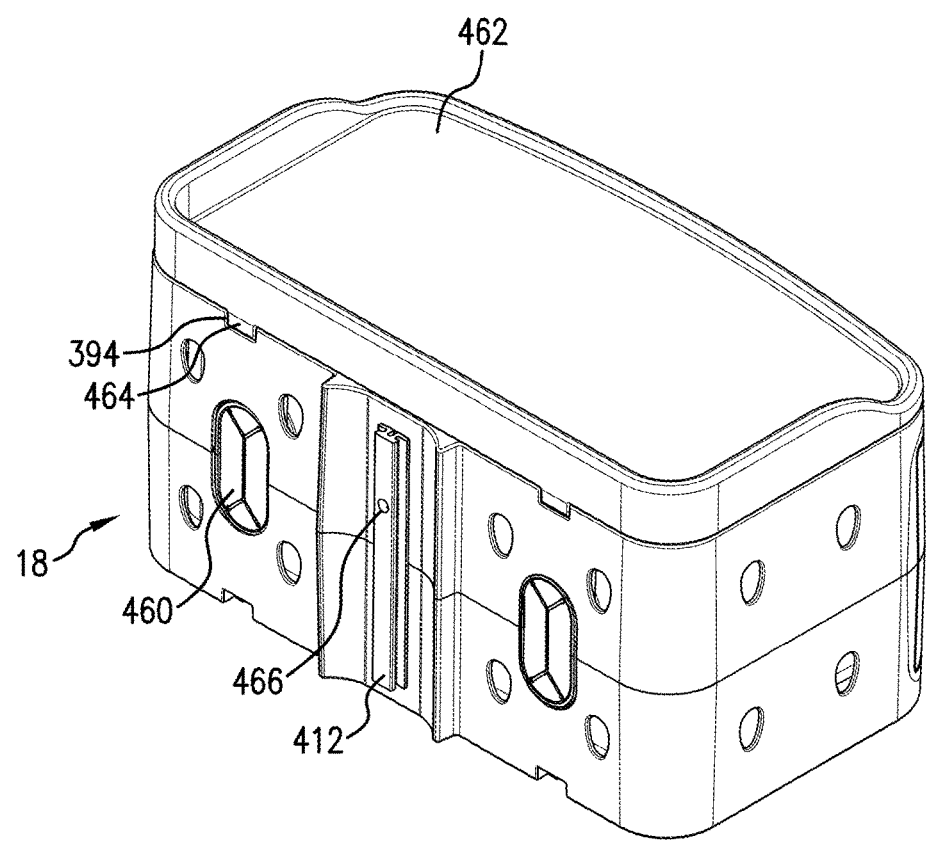
FIG. 12 is an upper rear perspective view of the upper cabinet shown in FIG. 9

The upper outer housing 390 includes track recesses 394 provided in an upper wall 396. In the illustrated embodiment, two track recesses 394 are provided each extending from adjacent a forward edge to a rear edge of the upper wall 396. A latch opening 398 is provided through the upper wall 396 and is positioned between the track recesses 394. Ramps 402 provided on a rear wall 404 define a channel 406 matching the configuration of the forward face 104 of the forward column 100 (see FIGS. 3 and 5). With respect to FIG. 11, an elongate notch 408 extends upwardly from a lower edge of the upper outer housing 390 and is positioned between the ramps 402. With reference to FIG. 12, a track 412, which can have a T-configuration in plan view, can be received in the notch 408 to cooperate with the track 106 formed in the forward column 100 (see FIG. 5). The upper outer housing 390 can further include curved cutouts 414 generally matching the configuration of the elliptical openings 376 provided in the inner housing 360. The upper outer housing 390 can further include accessory mounting openings 416 extending through the inner housing. The accessory mounting openings 416 can be provided to mount accessories to the cabinets 18, 20. The standoffs 366 space the inner housing 360 from the upper outer housing 390 to receive appropriately shaped key-shaped posts 418 (see FIG. 3) to mount accessories to the cabinets 18, 20. Male tracks 422 attach with the upper outer housing 390 and are received in the track recesses 394.

Figure 13:
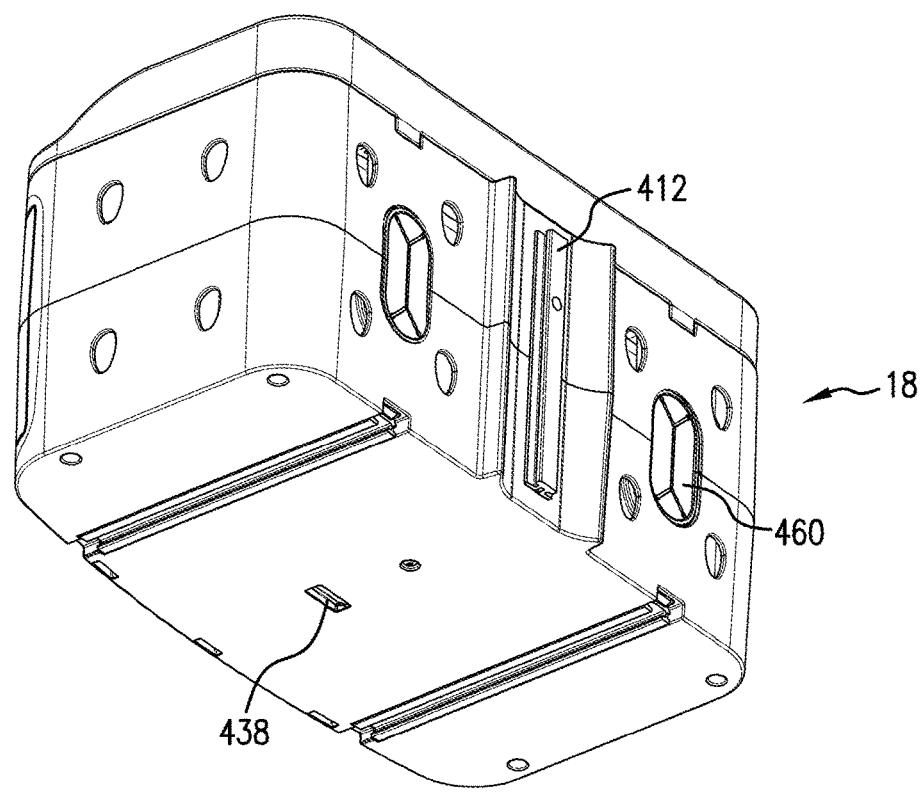
FIG. 13 is a lower rear perspective view of the upper cabinet shown in FIG. 9.

The lower outer housing 392 includes lower track recesses 434 provided in a lower wall 436. A latch recess 438 (see also FIG. 13) is provided in the lower wall 436. With respect to FIG. 14, the latch recess 438 on the upper cabinet 18 aligns with the latch opening 398 (see FIG. 11) of the lower cabinet 20 to attach the lower cabinet 20 with the upper cabinet 18. With reference back to FIG. 11, ramps 442 are provided on a rear wall 444 of the lower outer housing 392 and are similar in configuration to the ramps 402 on the upper outer housing 390. The ramps 442 define a channel 448 similar in configuration to the channel 406 provided on the upper outer housing 390. A notch 450, which is positioned between the ramps 442, extends from an upper edge of the lower outer housing 392 toward the lower edge. The notch 450 receives the track 412 (see FIG. 12). Curved cut outs 458 are provided in the rear wall 444 of the lower outer housing 392 and they are shaped similarly to the elliptical passage 376 through the inner housing 360. Accessory mounting openings 446 are also provided in the lower outer housing 392. The accessory mounting openings 446 are similar in configuration to the accessory mounting openings 416. The accessory mounting openings 416 in the upper outer housing 390 are vertically spaced from the accessory openings 446 in the lower outer housing 392 a dimension that is equal to a vertical dimension between the accessory mounting openings 446 in an upper cabinet and the accessory mounting openings 416 in a cabinet below. In other words, with reference to FIG. 2 dimension 452 is equal to dimension 454. Female tracks 456 attach with the lower outer housing 392 and are received in the recesses 434.

With reference to FIG. 12, covers 460 having flexible flaps are received in the elliptical openings 376 and the cut outs 414, 458. A tray 462 having appropriate downwardly extending tracks 464 for receipt in the recesses 394 (FIGS. 10 and 11) can be provided.

Figure 14:
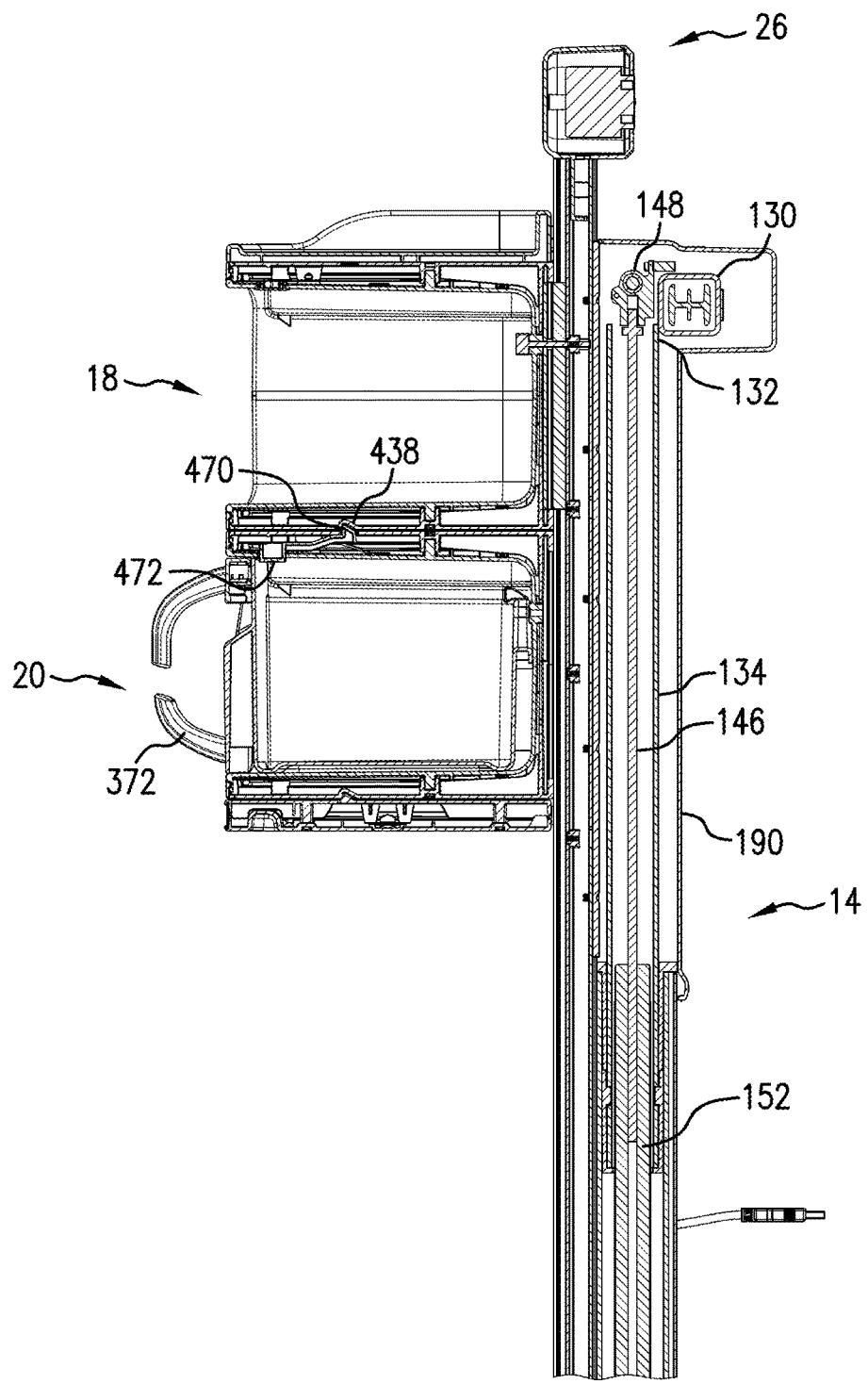
FIG. 14 is a cross-sectional view taken through the cabinets and vertical supports depicted in FIG. 1 for the movable table assembly depicted in FIG. 1.

To attach the upper cabinet 18 and the lower cabinet 20 to the vertical support 14, the track 412 on the rear of the upper cabinet 18 is slid into the track 106 on the forward column 100. The T-track includes an opening 466 that aligns with the fastener opening 378 in the inner housing 360. The openings 378 and 466 align with one of the forward openings 108 in the forward column 100. The fastener 350 (FIG. 3) is then inserted through the openings 378 (FIG. 11), 466 (FIG. 12), and threads into one of the forward openings 108 in the forward column 100. With the upper cabinet attached to the vertical support 14, the male tracks 422 can be slid into the female tracks 456. With reference back to FIG. 10, the latch 352 includes a catch 470 that extends through the latch opening 398 in the upper outer housing 390. The latch 352 is biased so that the catch 470 extends through the latch opening 398. With reference to FIG. 14, as the lower cabinet 20 is slid towards the vertical support 14 the catch 470 is biased into a space between the upper outer housing 390 and the inner housing 360 until the catch 470 is received in the latch recess 438 in the upper cabinet 18. To remove the lower cabinet 20 from the upper cabinet 18, an operator presses on a button 472 on the latch 352, which results in the catch 470 pivoting about a horizontal axis 474 so that the catch 470 no longer resides in the latch recess 438. With the catch 470 disengaged from the latch recess 438, the lower cabinet 20 can be removed from the upper cabinet 18. More cabinets than the upper cabinet 18 and the lower cabinet 20 can also be attached to the vertical support 14 in the same manner that the lower cabinet 20 attaches to the upper cabinet 18, which has been described above.

As mentioned above, the movable table assembly 10 can be provided with accessories such as the task light 22. The task light 22 includes the appropriately shaped post 418 for receipt in the accessory mounting openings 416 and 446. As mentioned above, the dimension 452 and 454 shown in FIG. 2 are identical so that accessories can mount to two different cabinets, e.g., the upper cabinet 18 and the lower cabinet 20. Furthermore, the ambient light fixture 24 can include tracks similar to the male tracks 422 shown in FIG. 11 for attachment with the lower cabinet 20. The ambient light fixture 24 is configured to direct light downwardly toward a support surface (e.g., floor) that supports the movable table assembly 10. Further accessories can attach to the cabinets by including extensions similar to the posts 418 shown in FIG. 3. For example, towel holders, cup holders, baskets, trash bin, and paper towel holders could also be provided with the appropriately shaped extensions.

A movable table assembly has been described above with particularity. Modifications and alterations will occur to those upon reading and understanding the preceding detailed description. The invention is not limited to only the embodiment described above. Instead, this document and disclosure is meant to include all such modifications and alterations that would occur to one of ordinary skill in the art after reading and understanding the preceding detailed description. It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A movable table assembly comprising:
a base including a longitudinal frame member, at least one wheel, and a cover covering the longitudinal frame member, the cover including a first vertical support mounting opening and a second vertical support mounting opening;
a vertical support connectable with the base at either a first mounting location adjacent a first end of the longitudinal frame member or a second mounting location adjacent a second, opposite, end of the longitudinal frame member, wherein the vertical support is received in the first vertical support mounting opening when the vertical support is connected with the base at the first mounting location, wherein the vertical support is received in the second vertical support mounting opening when the vertical support is connected with the base at the second mounting location;
a table connected with the vertical support and vertically offset from the base, wherein the table extends away from the vertical support toward the second end of the longitudinal frame member when the vertical support is connected with the base at the first mounting location and the table extends away from the vertical support toward the first end of the longitudinal frame member when the vertical support is connected with the base at the second mounting location.

2. The movable table assembly of claim 1, wherein the base includes a cap configured to connect with the cover and cover one of the first vertical support mounting opening and the second vertical support mounting opening when connected with the cover.

3. The movable table assembly of claim 1, wherein the base includes a frame assembly, wherein the frame assembly includes the longitudinal frame member, a first transverse member connected with the longitudinal frame member at the first end of the longitudinal frame member and a second transverse member connected with the longitudinal frame member at the second end of the longitudinal frame member, wherein each transverse frame member extends from the longitudinal frame member a greater distance in a forward direction as compared to a rearward direction.

4. The movable table assembly of claim 3, wherein the table is rotatable about a vertical axis with respect to the vertical support in the forward direction when the vertical support is connected with the base at the first mounting location and when the vertical support is connected with the base at the second mounting location.

5. The movable table assembly of claim 3, further comprising a cabinet connected with a forward face of the vertical support, the cabinet including a forward opening for providing a user of the movable table assembly access to inside the cabinet.

6. A movable table assembly comprising:
a base including a longitudinal frame member and at least one wheel;
a vertical support connectable with the base at either a first mounting location adjacent a first end of the longitudinal frame member or a second mounting location adjacent a second, opposite, end of the longitudinal frame member;
a table connected with the vertical support and vertically offset from the base, wherein the table extends away from the vertical support toward the second end of the longitudinal frame member when the vertical support is connected with the base at the first mounting location and the table extends away from the vertical support toward the first end of the longitudinal frame member when the vertical support is connected with the base at the second mounting location, wherein the table includes a first arm mount and a second arm mount spaced from the first arm mount; and
an arm connecting the table with the vertical support, wherein the arm is positioned in a first orientation when the vertical support is connected with the base at the first mounting location and the arm is positioned in a second orientation when the vertical support is connected with the base at the second mounting location, wherein the arm is rotated about a horizontal axis to move from the first orientation to the second orientation, wherein the arm contacts and connects with the first arm mount when the vertical support is connected with the base at the first mounting location, wherein the arm contacts and connects with the second arm mount when the vertical support is connected with the base at the second mounting location.

7. The movable table assembly of claim 6, wherein the table is rotatable with respect to the vertical support when the arm is in either the first orientation or the second orientation.

8. The movable table assembly of claim 6, further comprising an arm cover, wherein the arm cover covers the arm when the arm is in either the first orientation or the second orientation.

9. A movable table assembly comprising:
a base including at least one wheel;
a vertical support connected with the base;
a table connected with the vertical support and vertically offset from the base;
a first cabinet connected with the vertical support;
a second cabinet connected with the first cabinet, the second cabinet having an open front; and
a latch mechanism connecting the first cabinet with the second cabinet, the latch mechanism being accessible through the open front,
wherein each of the first cabinet and the second cabinet includes an upper recess formed in an upper wall and a lower recess formed in a lower wall,
wherein the first cabinet includes a lower track provided in the lower recess and the second cabinet includes an upper track provided in the upper recess, wherein the upper track engages the lower track to connect the first cabinet with the second cabinet.

10. The movable table assembly of claim 9, wherein the first cabinet is positioned above the second cabinet, wherein the latch mechanism includes a latch on the second cabinet and a latch recess on the first cabinet that selectively receives the latch to connect the second cabinet with the first cabinet.

11. The movable table assembly of claim 9, further comprising a drawer, wherein the second cabinet receives the drawer.

\* \* \* \* \*